United States Patent [19]

Hudson

[11] Patent Number: 5,025,325
[45] Date of Patent: Jun. 18, 1991

[54] GRAPHICS SCALING METHOD FOR HIGH RESOLUTION PRINTERS

[75] Inventor: Kevin R. Hudson, Vancouver, Wash.

[73] Assignee: Hewlett-Packard Company, Palo Alto, Calif.

[21] Appl. No.: 421,040

[22] Filed: Oct. 13, 1989

[51] Int. Cl.$^5$ .............................................. H04N 1/40
[52] U.S. Cl. ...................................... 358/447; 358/451
[58] Field of Search ............... 358/447, 474, 140, 400, 358/434, 443, 451

[56] References Cited

U.S. PATENT DOCUMENTS

| | | | |
|---|---|---|---|
| 4,280,143 | 7/1981 | Judd | 358/451 |
| 4,511,928 | 4/1985 | Colomb | 358/474 |
| 4,533,958 | 8/1985 | Herget | 358/448 |
| 4,644,409 | 2/1987 | Fuchs | 358/474 |
| 4,682,869 | 7/1987 | Itoh et al. | 358/426 |

Primary Examiner—Joseph A. Orsino
Assistant Examiner—Thomas D. Lee

[57] ABSTRACT

The invented method scales a graphics image by recognizing under what resolution the image was created, identifying the resolution of the printer that will actually print the image, calculating a convenient virtual resolution, approximating, on a pixel-by-pixel basis, using the virtual resolution, how many new pixels are required to emulate each existing pixel and then storing the new pixels in memory or printing them.

12 Claims, 1 Drawing Sheet

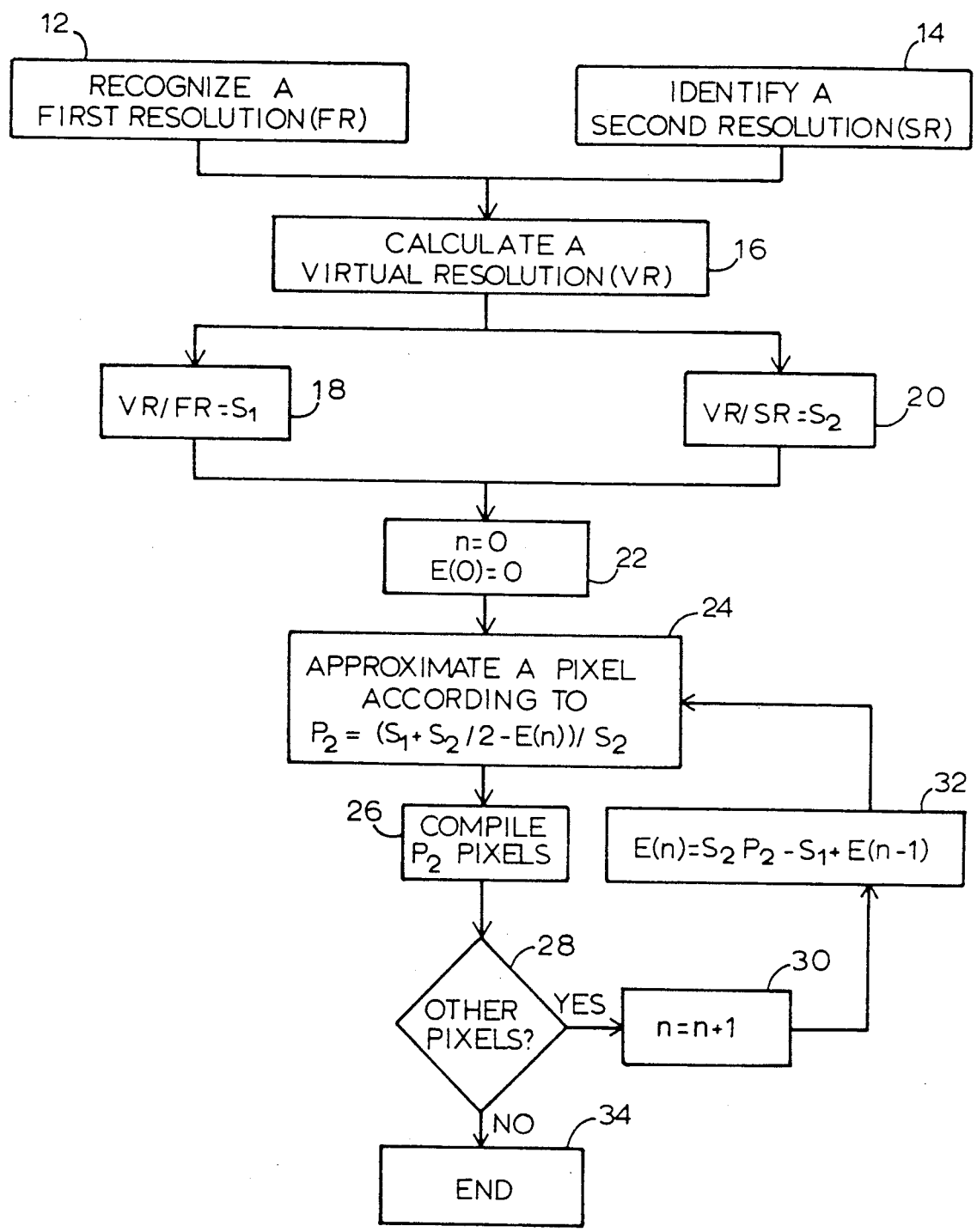

GRAPHICS SCALING METHOD FOR HIGH RESOLUTION PRINTERS

TECHNICAL FIELD

This invention relates to a method for scaling graphics and, more particularly, to a method for scaling graphics created for a low resolution printer so that they may be printed by a higher resolution printer.

BACKGROUND ART

Computer printers are used with various host computers and with different software applications. When a new printer is introduced onto the market, users want it to work with the software applications they already own. However, previously existing software applications were written for previously existing printers. Problems arise when the new printer has new features, such as a higher resolution, because the existing software applications do not support the new features. For example, an old software application that was written to work with an old printer may only be able to create images at a low resolution. If a user attempts to print those images on a new, high-resolution printer, then the image will be distorted and dimensionally incorrect.

Currently existing inkjet printers do not address that problem and only support graphics in their own resolutions. When those printers are used to print graphics created under a lower resolution, the result is an image with a different size and aspect ratio than the original.

The invented method was designed to address those problems and was primarily developed for use in Hewlett-Packard's ® DeskJet ® printer. The use of the invention in the DeskJet ® printer illustrates the method's utility.

To support previously existing software applications, the DeskJet ® printer was designed to emulate existing printers such as the Epson FX-80 printer. A problem in creating the DeskJet's ® emulation capability was that the basic print resolution of the DeskJet ® is 300-dots-per-inch ("dpi") vertically and horizontally in a raster pattern. In contrast, the Epson FX-80 is a column-oriented graphics device with a vertical resolution of 72-dpi and selectable horizontal resolutions of 60, 72, 80, 90, 120 and 240-dpi. Thus, customized software had to be created to emulate the Epson FX-80. It should be noted that the Epson FX-80 emulation does not support all of the DeskJet's ® features. The emulation was created so that existing software applications could work with a DeskJet ® printer even though they did not support it.

The invented "Graphics Scaling Method for High Resolution Printers" was developed to accomplish that emulation. The method is applicable to any situation where it is desired that one printer emulate another printer of an equal or lower resolution. Thus, the invented method overcomes the problem of image distortion when an image is created for one printer but actually printed on a different, higher-resolution printer.

DISCLOSURE OF THE INVENTION

The invented method scales a graphics image by recognizing under what resolution the image was created, identifying the resolution of the printer that will actually print the image, calculating a convenient virtual resolution, approximating, on a pixel-by-pixel basis, using the virtual resolution, how many new pixels are required to emulate each existing pixel and then storing the new pixels in memory or printing them.

BRIEF DESCRIPTION OF THE DRAWING

The single drawing is a block diagram showing the steps of the invented method.

DETAILED DESCRIPTION AND BEST MODE FOR CARRYING OUT THE INVENTION

Computer-generated graphics images are made from pixels or picture elements. In the case of an ink-jet printer, a pixel may simply be a dot. When enough dots are combined, an image is created. The number of pixels or dots that can exist in a certain distance defines the image's resolution.

Different printers print images at different resolutions because of mechanical restraints. Thus, a printer's resolution is the number of pixels it can print in a certain distance. In other words a printer's resolution defines a matrix of positions that can be occupied by pixels or dots. As stated, resolution is often expressed in dots-per-inch.

The invented method identifies each pixel of an image to be scaled and approximates or creates new, multiple pixels to emulate each identified pixel. Each pixel of the original image is approximated and multiple pixels at a higher resolution take its place. The multiple pixels may also be referred to as emulating pixels because they emulate the original pixels.

As shown in the block diagram at step 12, the method recognizes an image as an arrangement of pixels at a first resolution. The first resolution ("FR") is the resolution that the image was created under or the resolution that will be emulated. The method also identifies a second resolution ("SR") at step 14. The second resolution is the target resolution or the resolution to which the image will be scaled. In the case of a printer, the second resolution is the resolution of the printer that will actually print the image. For this method, the second resolution must be greater than or equal to the first resolution.

To recognize and identify the first and second resolutions, the method looks at a virtual image. In other words, the method examines the data defining the image that will be scaled.

At step 16 the method calculates a virtual resolution ("VR"). The virtual resolution is a resolution of arbitrary units used in the invented method. It is a multiple of the first and second resolutions so that only integral arithmetic is used in the method and it may be the least common multiple. If the first and second resolutions are expressed in terms of dots-per-inch, the virtual resolution is expressed in units-per-inch.

With the first, second and virtual resolutions known, the invented method employs the following generalized equations to scale an image:

$$P_2 = (S_1 + S_2/2 - E(n))/S_2$$

$$E(0) = 0$$

$$E(n+1) = S_2 P_2 - S_1 + E(n)$$

In these equations, $P_2$ is the number of pixels at the second resolution needed to approximate or emulate a pixel at the first resolution. $S_1$ is the number of virtual resolution units per first resolution position and it is calculated by dividing the virtual resolution by the first resolution. Similarly, $S_2$ is the number of virtual resolution units per second resolution position. E(n) is the cumulative scaling error that is initially set at zero.

When the method approximates a pixel at the first resolution by creating multiple pixels at the second resolution, it often needs a fraction of a pixel to exactly emulate the original pixel. For example, the method may determine that 4.3-pixels are needed to emulate one original pixel. Because pixels are the basic parts of the image and partial pixels cannot be supplied, there is a scaling error of 0.3-pixel. The invented method accounts for that error through the E(n) term in the above-described equation. In other words, you begin with a zero error factor and you approximate the first pixel and probably will get an error. You then approximate the next pixel plus the previous error and determine how many new pixels are needed to emulate the original pixel plus error. In this manner E(n) may be thought of as a propagating or cumulative error factor. The lower case "n" is simply an index that begins at zero and increases for each pixel approximated.

The step of determining the value of $S_1$ is shown in the drawing at 18, and the step of determining the value of $S_2$ is shown at 20. E(0) and "n" are set to zero in step 22. As shown in the drawing, the basic equation is used to approximate a pixel at step 24.

The method determines the value of $P_2$ for a first pixel and compiles the $P_2$ pixels, as shown in step 26, by either storing them in memory or printing them. The method then determines whether the image has other pixels that have not been approximated. If so, it increases the value of "n" and moves to the next pixel, as symbolized by step 30, and calculates a new cumulative error at step 32. Because "n" was increased at step 30, the new cumulative error is expressed as E(n) in step 32, and the previous error is expressed as E(n−1). The combination of steps 30 and 32 is equivalent to the above-listed error equation for E(n+1). As can be seen in step 32, E(n) is calculated in part from the value of the immediately previous $P_2$. The method then repeats beginning with step 24 until all the pixels have been approximated and the entire image has been scaled, at which time the method ends as shown by step 34.

Typically at step 26 the method would store the new, multiple pixels in memory. However, if the method prints the multiple pixels, it may print them while it approximates other pixels.

To illustrate the method, take the case of scaling an image of pixels created at a resolution of 72-dpi vertically and 90-dpi horizontally. Assume that the image will be printed by a printer having a 300-dpi resolution both vertically and horizontally. Thus, the value of the first resolution is 72-dpi vertically and 90-dpi horizontally, and the value of the second resolution is 300-dpi. From the first and second resolutions the method calculates a convenient virtual resolution, such as 10,800 units per inch ("upi"), the least common multiple of the resolutions. Again, the virtual resolution requires only the use of integral arithmetic. Thus:

$S_2$ = (10800-upi)/(300-dpi) = 36-units/dot
$S_1$ = (10800-upi)/(90-dpi) = 120-units/dot
(horizontal expansion)
$S_1$ = (10800-upi)/(72-dpi) = 150-units/dot
(vertical expansion)

These values may then be used in the above-described equations, and the number $P_2$ of multiple pixels needed to emulate each pixel of the original image may be calculated.

Both the horizontal and vertical scaling of an original pixel can be done by using the above-described equations. Additionally, the number of virtual resolution units per first resolution position $S_1$ may be different in the horizontal and vertical axes, as seen in the above calculations.

The above-described equations may also be reduced to algorithms that require only addition and subtraction. In practice, speed and throughput can be increased by eliminating the use of multiply and divide steps, which is critical when handling large amounts of graphics data. To do this, the number $P_2$ of multiple pixels needed to approximate an original pixel is determined by repetitively adding $S_2$ to the constant $S_2/2 - E(n)$ until the result exceeds $S_1$. A new pixel is output at each addition step, resulting in the new, multiple pixels that will be part of the scaled image. When the method approximates the next pixel, the next error term, E(n+1), is simply the result of the previous additions minus $S_1$.

The multiple pixels that result from the scaling method are stored and arranged in raster format. Thereby, column graphics information may be converted to raster format and scaled to a higher resolution.

The invented method may also increase throughput by taking advantage of the fact that the vertical scaling is just duplication of the scaled raster rows. Often, pixels are not scaled vertically until the complete graphics raster row has been scaled horizontally. The reason for this is that once the horizontal scaling is done, the vertical scaling is simply a matter of copying the raster rows a given number of times, which is much faster than pixel-by-pixel scaling.

Another way to increase throughput involves trapping out white space, or pixel positions that are unoccupied. To accomplish this, the raster buffer is always cleared before it is used so that blank or white areas in the initial image do not have to be scaled into the buffer. Only the position for the next pixel needs to be calculated. Experimentation has shown that throughput is increased for any image that has at least 5% white space. The more white space, the greater the throughput gain.

In some situations, when an image is printed by a printer having a printhead, the placement of the printhead may cause a mismatch between the virtual resolution and the mechanical resolution of the printer. This mismatch may be referred to as inappropriate vertical positioning, and results in a mechanism error that must be synchronized with the scaling process. This is done by monitoring the page position to detect when vertical positioning will move the paper to far because of the mismatch. When such a move is predicted, the scaling routine produces an extra row to compensate.

INDUSTRIAL APPLICABILITY

The invented method is applicable to computer printers and other output devices where it is desired to scale an image from one resolution to a greater resolution. In other words, the invented method is applicable to high resolution computer printers and other output devices that emulate lower resolution printers and output devices. Additionally, the invented method may be used to scale text characters. In such a case, the text characters are treated as graphics and pica, elite and compressed character pitches are produced by changing the horizontal scaling. While the best mode and preferred embodiment have been disclosed, changes may be made without departing from the scope of the invention.

What is claimed is:

1. A method of scaling an image comprising:
   recognizing such image as an arrangement of pixels at a first resolution of pixel positions;
   identifying a second resolution of pixel positions, greater than the first resolution;
   calculating a virtual resolution that is a multiple of the first and second resolutions and that may be expressed in arbitrary units;
   approximating each pixel of such image at the first resolution as multiple pixels at the second resolution according to:

$$P_2 = (S_1 + S_2/2 - E(n))/S_2$$

$$E(0) = 0$$

$$E(n+1) = S_2 P_2 - S_1 + E(n)$$

where $P_2$ is the number of pixels at the second resolution needed to approximate each pixel at the first resolution, $S_1$ is the number of virtual resolution units per first resolution position, $S_2$ is the number of virtual resolution units per second resolution position, and $E(n)$ is a cumulative scaling error; and
   compiling the $P_2$ pixels at the second resolution to create a scaled image.

2. The method of claim 1, wherein $S_1$ may be different in horizontal and vertical directions.

3. The method of claim 1, wherein such image is scaled horizontally before it is scaled vertically with the horizontal scaling resulting in scaled raster rows, and wherein such image is scaled vertically by duplicating the scaled raster rows.

4. The method of claim 1, wherein such image is in a column-oriented format, including changing such image to raster format.

5. A method of scaling an image comprising:
   recognizing such image as an arrangement of pixels at a first resolution of pixel positions;
   identifying a second resolution of pixel positions, greater than the first resolution;
   calculating a virtual resolution that is a multiple of the first and second resolutions and that may be expressed in arbitrary units;
   dividing the virtual resolution by the first resolution to obtain the number of virtual resolution units per first resolution position, $S_1$;
   dividing the virtual resolution by the second resolution to obtain the number of virtual resolution units per second resolution position, $S_2$;
   approximating each pixel of such image at the first resolution as multiple pixels at the second resolution according to:

$$P_2 = (S_1 + S_2/2 - E(n))/S_2$$

$$E(0) = 0$$

$$E(n+1) = S_2 P_2 - S_1 + E(n)$$

where $P_2$ is the number of pixels at the second resolution needed to approximate each pixel at the first resolution, $E(n)$ is a cumulative scaling error, and n is an index that begins at zero and increases one for each pixel approximated; and
   compiling the $P_2$, pixels at the second resolution to create a scaled image.

6. The method of claim 5, wherein $S_1$ may be different in horizontal and vertical directions.

7. The method of claim 5, wherein such image is scaled horizontally before it is scaled vertically with the horizontal scaling resulting in scaled raster rows, and wherein such image is scaled vertically by duplicating the scaled raster rows.

8. The method of claim 5, wherein such image is in a column-oriented format, including changing such image to raster format.

9. A method of scaling an image comprising:
   recognizing such image as an arrangement of pixels at a first resolution of pixel positions;
   identifying a second resolution of pixel positions, greater than the first resolution;
   calculating a virtual resolution that is a multiple of both the first and second resolutions and that may be expressed in arbitrary units;
   dividing the virtual resolution by the first resolution to obtain the number of virtual resolution units per first resolution position, $S_1$;
   dividing the virtual resolution by the second resolution to obtain the number of virtual resolution units per second resolution position, $S_2$;
   approximating each pixel of such image at the first resolution as multiple pixels at the second resolution by repetitively adding $S_2$ to the constant $S_2/2 - E(n)$ until the result exceeds $S_1$, where $E(n)$ is a cumulative scaling error, n is an index of each pixel approximated, $E(0) = 0$, and $E(n+1)$ equals the result of the additions minus $S_1$, and creating an emulating pixel at the second resolution upon each addition; and
   compiling the emulating pixels at the second resolution to create a scaled image.

10. The method of claim 9, wherein $S_1$ may be different in horizontal and vertical directions.

11. The method of claim 9, wherein such image is scaled horizontally before it is scaled vertically with the horizontal scaling resulting in scaled raster rows, and wherein such image is scaled vertically by duplicating the scaled raster rows.

12. The method of claim 9, wherein such image is in a column-oriented format, including changing such image to raster format.

* * * * *